(12) United States Patent
Mire

(10) Patent No.: US 7,499,551 B1
(45) Date of Patent: Mar. 3, 2009

(54) PUBLIC KEY INFRASTRUCTURE UTILIZING MASTER KEY ENCRYPTION

(75) Inventor: Philip Jason Mire, Dripping Springs, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/312,150

(22) Filed: May 14, 1999

(51) Int. Cl.
*H04L 9/00* (2006.01)
*G06F 7/58* (2006.01)
*G06F 12/14* (2006.01)

(52) U.S. Cl. .................. 380/279; 380/44; 380/277; 380/278; 380/281; 380/282; 380/283; 380/284; 380/285; 726/9; 726/20; 713/168; 713/171; 713/172; 713/182; 713/185; 713/189; 713/193

(58) Field of Classification Search ......... 380/277–279, 380/201, 44, 281–285; 713/156, 168, 171, 713/172, 182, 185, 189, 193; 726/9, 20
See application file for complete search history.

(56) References Cited

U.S. PATENT DOCUMENTS

| | | | | |
|---|---|---|---|---|
| 4,193,131 A | * | 3/1980 | Lennon et al. ............... | 375/2 |
| 4,423,287 A | * | 12/1983 | Zeidler ........................ | 705/71 |
| 5,222,140 A | * | 6/1993 | Beller et al. .................. | 380/30 |
| 5,241,599 A | * | 8/1993 | Bellovin et al. .............. | 380/21 |
| 5,313,521 A | * | 5/1994 | Torii et al. ................... | 380/21 |
| 5,315,658 A | | 5/1994 | Micali ......................... | 380/30 |
| 5,555,303 A | | 9/1996 | Stambler ..................... | 380/25 |
| 5,555,309 A | * | 9/1996 | Kruys .......................... | 380/21 |
| 5,557,346 A | | 9/1996 | Lipner et al. ................. | 380/21 |
| 5,602,918 A | * | 2/1997 | Chen et al. ................... | 713/153 |
| 5,631,961 A | * | 5/1997 | Mills et al. ................... | 380/21 |

(Continued)

FOREIGN PATENT DOCUMENTS

| | | |
|---|---|---|
| EP | 0535863 A2 * | 7/1993 |
| EP | 0889617 A2 * | 7/1999 |

OTHER PUBLICATIONS

Schneier, Bruce, Applied Cryptography, 1996, John Wiley & Sons, Inc., Second Edition, pp. 4, 5, and 185-187.*

(Continued)

*Primary Examiner*—Christopher A Revak
*Assistant Examiner*—Aravind K Moorthy
(74) *Attorney, Agent, or Firm*—Haynes and Boone, LLP

(57) ABSTRACT

The disclosure encrypts and decrypts data using public key infrastructure with and allows an authorized third party to access and decrypt the encrypted data as required without requiring private key escrow. The disclosure utilizes a user private key, a user public key, a master private key, a master public key, and a session key generated by the system. The data is encrypted utilizing the session key. The session key is encrypted once utilizing the user public key and again utilizing the master public key. The encrypted data and the encrypted session keys are included in a data packet that is transmitted from one data processing system to another. The session key is decrypted utilizing the user private key. The data is decrypted utilizing the session key. When the authorized third party requires access to the data on the destination processing system, the session key is decrypted with the master private key and the data is decrypted with the session key.

13 Claims, 2 Drawing Sheets

U.S. PATENT DOCUMENTS

| | | | | |
|---|---|---|---|---|
| 5,633,929 A * | 5/1997 | Kaliski, Jr. | | 380/286 |
| 5,640,454 A | 6/1997 | Lipner et al. | | 380/21 |
| 5,659,618 A | 8/1997 | Takahashi et al. | | 380/49 |
| 5,664,017 A | 9/1997 | Gressel et al. | | 380/30 |
| 5,706,347 A * | 1/1998 | Burke et al. | | 380/21 |
| 5,740,250 A * | 4/1998 | Moh | | 380/28 |
| 5,742,756 A * | 4/1998 | Dillaway et al. | | 395/186 |
| 5,745,571 A | 4/1998 | Zuk | | 380/21 |
| 5,745,573 A | 4/1998 | Lipner et al. | | 380/21 |
| 5,745,887 A * | 4/1998 | Gargiulo et al. | | 705/410 |
| 5,754,761 A | 5/1998 | Willsey | | 395/186 |
| 5,768,373 A * | 6/1998 | Lohstroh et al. | | 380/286 |
| 5,778,072 A | 7/1998 | Samar | | 380/30 |
| 5,799,290 A * | 8/1998 | Dolan et al. | | 705/410 |
| 5,841,865 A | 11/1998 | Sudia | | 380/21 |
| 5,850,443 A | 12/1998 | Van Oorscot et al. | | 380/21 |
| 5,850,451 A | 12/1998 | Sudia | | 380/49 |
| 5,917,911 A * | 6/1999 | Dabbish et al. | | 380/286 |
| 5,982,896 A * | 11/1999 | Cordery et al. | | 705/62 |
| 6,002,768 A * | 12/1999 | Albanese et al. | | 713/175 |
| 6,005,938 A | 12/1999 | Banker et al. | | 380/239 |
| 6,009,173 A * | 12/1999 | Sumner | | 713/156 |
| 6,122,736 A * | 9/2000 | Vanstone et al. | | 713/169 |
| 6,246,771 B1 * | 6/2001 | Stanton et al. | | 380/286 |
| 6,336,186 B1 * | 1/2002 | Dyksterhouse et al. | | 713/156 |
| 6,438,666 B2 * | 8/2002 | Cassagnol et al. | | 711/163 |
| 6,820,063 B1 * | 11/2004 | England et al. | | 705/54 |
| 2004/0111600 A1 * | 6/2004 | Kaler et al. | | 713/150 |
| 2006/0193474 A1 * | 8/2006 | Fransdonk | | 380/279 |
| 2008/0022121 A1 * | 1/2008 | Fu et al. | | 713/185 |

OTHER PUBLICATIONS

Chiou et al, Secure Broadcasting Using the Secure Lock, 1989, IEEE, pp. 929-934.*

Lin et al, Integrated Authenticatoins Based on Identities, 1996, IEEE, pp. 37-41.*

Cheng et al, A Security Architecture for the Internet Protocol, 1998, IBM Systems Journal, pp. 42-60.*

Youssef et al, Comments on the Security of Fast Encryption Algorithm for Multimedia (FEA-M), 2003, IEEE, pp. 168-170.*

Simon et al, A Cryptographic Protocol to Obtain Secure Communications in Extended Ethernet Environment, 1992, IEEE, pp. 254-261.*

Nathan Tyler, "PGP Business Security Suite: Complete Security Solution Protects Email And Digital Assets From The Desktop To The Internet," *Network Associates, Inc.*, (Press Release), Oct. 2, 1997, pp. 1-5.

* cited by examiner

PUBLIC KEY INFRASTRUCTURE UTILIZING MASTER KEY ENCRYPTION

BACKGROUND

This disclosure relates to cryptographic communications systems, and more particularly, to a public key infrastructure that provides a master public key to enable authorized access to encrypted files.

Electronic commerce enables organizations to communicate, advertise, market and sell their products and services over computer networks such as the Internet. The opportunities that this new technology offers are immense, permitting business to become truly global in its outlook and activity. Electronic commerce will allow anyone with access to the Internet to request information on a particular product or service, place an order for that product or service, and pay for it. All this will be done from a business or home computer, irrespective of whether the customer and the company are separated by ten or ten thousand miles. This has major implications for the way in which business will be conducted in the 21st century.

The need for secure electronic transmission of digital information is widely recognized across a wide range of industries engaged in electronic commerce. Transmission of information over unsecured or unprotected communication channels risks exposing the transmitted information to electronic eavesdropping or alteration. A number of cryptographic communication systems are currently available to preserve the privacy of electronically transmitted digital information and to prevent monitoring by unauthorized parties of messages transmitted over an insecure channel. Cryptographic communication systems also improve the integrity of the transmissions by preventing unauthorized parties from altering information in messages transmitted over an insecure channel. The cryptographic systems can further improve the integrity and authenticity of the transmission by providing for recognizable, unforgeable and document-dependent digitized signatures that can prevent a user from denying that they sent or received a message, thereby establishing confidence in electronic transactions.

Cryptographic systems involve the encoding or encrypting of digital data transmissions, including digitized voice or video transmissions, to render them incomprehensible by all but the intended recipient. A plain text message consisting of digitized sounds, letters, and/or numbers is encoded numerically and then encrypted using one of several complex mathematical algorithms that transforms the encoded message based on a given set of numbers or digits, also known as a cipher key. The cipher key is a sequence of data bits that may either be randomly chosen or have special mathematical properties, depending on the algorithm or crypto-system used. Sophisticated cryptographic algorithms implemented on computers can transform and manipulate numbers that are hundreds or thousands of bits in length and can resist known methods of unauthorized decryption.

There are two basic classes of cryptographic algorithms: symmetric key algorithms and asymmetric key algorithms. Symmetric key algorithms use an identical cipher key for both encrypting by the sender of the communication and decrypting by the receiver of the communication. Symmetric key crypto-systems are built on the mutual trust of the two parties sharing the cipher key to use the crypto-system to protect against distrusted third parties. The sender and recipient must exchange the cipher key over a secure channel in advance of the desired communications between the sender and recipient. This process is often slow and cumbersome, and cannot be used in situations requiring spontaneous or unsolicited communications, or in situations requiring communications between parties unfamiliar with each other. Moreover, interception of the cipher key by an unauthorized third party enables that party to eavesdrop on both ends of the encrypted conversation.

The second class of cryptographic algorithms, i.e. asymmetric key algorithms, uses different cipher keys for encrypting and decrypting. The user makes the encryption key public and keeps the decryption key private, and it is not feasible to derive the private decryption key from the public encryption key. Thus, anyone who knows the public key of a particular user could encipher a message to that user, whereas only the user who is the owner of the private key corresponding to that public key could decipher the message.

Public Key Infrastructure (PKI) is a set of security services that utilizes one or more asymmetric key algorithms in which messages encrypted with one key can only be decrypted with a second key, and vice-versa in a distributed computing system. PKI allows organizations to establish security domains in which they issue keys and certificates authenticating the keys. PKI also allows an organization to update and recover keys and to place keys in escrow to facilitate issuing authenticating keys. Key escrow is the retention of encryption keys by a neutral agency so as to allow access to authorized parties if third-party decryption of encrypted text is necessary. A strong public-key system is one in which possession of both the algorithm and one key gives no useful information about the other key and thus no clues as to how to decrypt the message. A user of a public key system publishes one key, but keeps the other one secret. The world can use the public key to send messages that only the private key owner can read, and the private key can be used to send messages that could only have been sent by the private key owner.

PKI allows users to append a digital signature to an unencrypted message. A digital signature encrypted with a private key uniquely identifies the sender and connects the sender to the exact message. When combined with a digital time stamp, the message can also be proved to have been sent at a certain time. To create a signature, the sender must put their message through a one-way "hash function" to create a fixed-length string of data that represents the content of the message. This hash value is encrypted using an encryption key, thereby creating the sender's digital signature. The signature is then attached to the message. When the recipient gets the message they use a key to decrypt the digital signature, producing a hash value. They then put the message through the same hash function the sender used to create a hash value and compare the hash value they have re-created with the hash value they decrypted from the digital signature. If the hash value the recipient re-creates matches the hash value sent with the message, they know that no-one has tampered with the message. If anyone has changed even one bit in the message, the hash value the recipient re-creates will be different. By using the key that belongs to the sender to decrypt the signature, the recipient knows that the message could only have been "signed" by the key holder. If it was signed by someone else the signature would not decrypt properly. This is how a digital signature provides integrity and authentication.

In a symmetric key system the sender and the recipient both have the same encryption key, but this method only provides two security services often referred to as authentication and integrity. It does not provide non-repudiation because either party could have created the message. To provide non-repudiation, an asymmetric encryption routine is used. Asymmetric encryption algorithms use a public key and a private key. A signature created with the private key can only be decrypted with the corresponding public key from that pair. To guarantee the security of the key pair, the owner of the private key must keep it a secret, while their public key is made available publicly. Thus, only the owner of the private key can sign messages using that key, but anyone who has their corresponding public key can decrypt their signature. Because the sender used a private key known only to them to encrypt the hash value, they can't deny having signed the message because no-one else can create that signature. This provides non-repudiation.

With the aid of PKI it is thus possible to establish a secure line of communication with anyone who is using a compatible decryption system. Sender and receiver no longer need a secure way to agree on a shared key. If one user wishes to communicate with another, they exchange the plain text of their public keys using compatible public-key cryptographic software. Each user then encrypts their outgoing messages with the other's public key and decrypts received messages with their own secret, private key. The security of PKI thus relies upon the security of the private key. Because a third party may send their own key claiming to be another sender, the usefulness of digital signature as an authenticating tool is limited by the ability of the recipient to ensure the authenticity of the key used to verify the signature. In order to rely on the authenticity of the public key, a user needs to get it from some source other than the user sending the message.

Digital certificates are used to bind keys to a particular user. Digital certificates are electronic equivalents of a passport or identity card and are used to verify which keys belong to which user. Certification authorities are the organizations that issue digital certificates. Their function is to verify the identity of a particular user and issue a certificate to that user. Digital certificates contain as a minimum the individual's identity, the individual's public key, the Certification Authority's identity, and the Certification Authority's digital signature. An individual's certificate is typically freely available to anyone wishing to verify a signature. Certification can be provided by either private or governmental organizations. The only requirement is that the Certification Authority is trusted by both the signatory and the recipient. Certificates are often stored on electronic smart cards. Smart cards are usually the same size as credit cards and may also include data processing capability to allow the signing and verification operations to be performed on the cards themselves. Smart cards are seen as desirable as they provide an extra layer of security when storing a individual's signing code.

There are two basic kinds of smart cards. An "intelligent" smart card contains a central processing unit (CPU) that has the ability to store and secure information, and logic algorithms for making decisions as required by the card issuer's specific applications needs. Because intelligent cards offer a "read/write" capability, new information can be added and processed. The second type of card is often called a memory card. Memory cards are primarily information storage cards that contain stored value which the user can "spend" in a pay phone, retail, vending or related transaction. The intelligence of the integrated circuit chip in both types of cards allows them to protect the information being stored from damage or theft. For this reason, smart cards are much more secure than magnetic stripe cards, which carry information on the outside of the card and can be easily copied.

Corporations and other organization may use encryption for internal and external communications. When a number of users have access to internal data processing systems, means to gain access to encrypted files sent between users on the system and from outside sources are required in situations when there is a need to unlock a critical file and the user is unavailable. This may occur, for example, when a user refuses to produce his private keys or terminates employment suddenly and is unavailable to produce the private keys.

The current method to solving this problem is for the organization to escrow all keys and the authenticating certificates issued to users in the organization. This requires a complex database management system to track keys when a large number of users have access to the system.

A further complication arises if the organization wishes to use the certificates to digitally sign documents. In order to insure authenticity of the signatures, the signatures must be non-reputable, which means that the user cannot deny having sent or received transaction data. When keys are escrowed, there is always the possibility that a third party may gain unauthorized access to the keys and compromise security of digital signatures. One way to avoid this is to generate one key pair for digital signatures that is not escrowed, and another key pair for session key exchange that is escrowed. This results in even more complex system requirements to generate two private keys and two public keys per individual. A simpler system for allowing an organization to gain access to critical encrypted information without compromising security is required.

SUMMARY

In accordance with the present disclosure, there is provided a data encryption and decryption system using public key infrastructure that allows an authorized third party to accept and decrypt the encrypted data as required without requiring a private key escrow. The disclosure utilizes a user private key, a user public key, a master private key, a master public key, and a session key generated by the system. The data is encrypted utilizing the session key. The session key is encrypted once utilizing the user public key and again utilizing the master public key. The encrypted data and the encrypted session keys are included in a data packet that is transmitted from one data processing system to another. The session key is decrypted utilizing the user private key. The data is decrypted utilizing the session key. When the authorized third party requires access to the data on the destination processing system, the session key is decrypted with the master private key and the data is decrypted with the session key.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
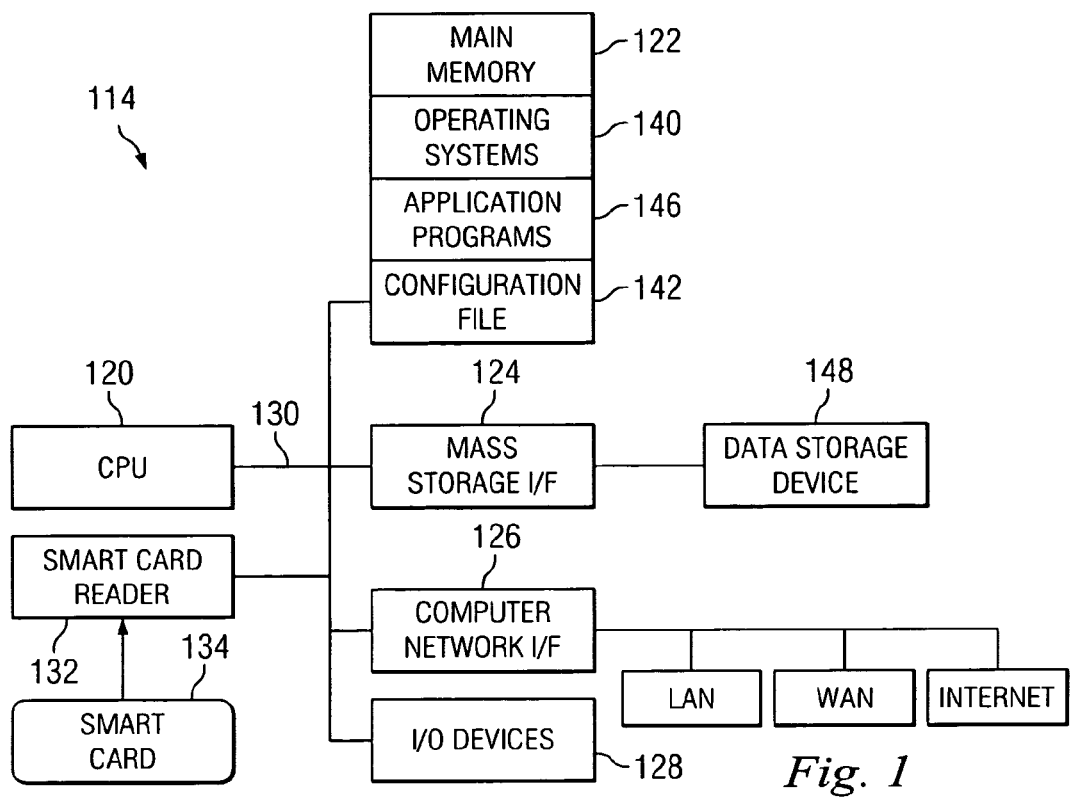
FIG. 1 is a block diagram of a typical data processing system with which the present disclosure may be utilized.

Referring to FIG. 1, data processing system 114 includes a central processing unit (CPU) 120, main memory 122, mass storage interface 124, network interface 126, and input/output devices 128 all connected by system bus 130. Those skilled in the art will appreciate that this system encompasses all types of data processing systems: personal computers, midrange computers, mainframes, etc. Note that many additions, modifications, and deletions can be made to this data processing system 114 when used as a component of the present disclosure. Examples of I/O devices 128 that may be connected to system bus 130 for entering and receiving data include a computer display monitor, an input keyboard, a mouse, and a printer. Data processing system 114 may be one of many workstations connected to a local area network (LAN), a wide area network (WAN), or a global information network such as the Internet.

CPU 120 can be constructed from one or more microprocessors and/or integrated circuits. Main memory 122 stores programs and data that the CPU 120 may access. When data processing system 114 starts up, CPU 120 initially executes the operating system 140 program instructions. Operating system 140 is a program that manages the resources of data processing system 114, such as CPU 120, main memory 122, mass storage interface 124, network interface 126, I/O devices 128, and system bus 130. The operating system 140 reads one or more configuration files 142 to determine the hardware and software resources connected to data processing system 114.

Main memory 122 includes the operating system 140, configuration file 142, and one or more application programs 146 with related program data. Application programs 146 can run with program data as input, and output their results as program data in main memory 122 or to one or more mass storage devices 148 through mass storage interface 124. The CPU 120 executes many application programs such as an application program 146 to establish a connection to a computer network through network interface 126. CPU 120 also executes an application program 146 for encrypting and decrypting digital data as described hereinbelow. The application program 146 may be embodied in one executable module or it may be a collection of routines that are executed as required.

Mass storage interface 124 allows data processing system 114 to retrieve and store data from auxiliary storage devices such as magnetic disks (hard disks, diskettes) and optical disks (CD-ROM). The mass storage devices are commonly known as Direct Access Storage Devices (DASD), and act as a permanent store of information. The information from the DASD can be in many forms including application programs and program data. Data retrieved through mass storage interface 124 is usually placed in main memory 122 where CPU 120 can process it.

While main memory 122 and data storage devices 148 are typically separate storage devices, data processing system 114 may use known virtual addressing mechanisms that allow the programs of data processing system 114 to behave as if they only have access to a large, single storage entity, instead of access to multiple, smaller storage entities (e.g., main memory 122 and mass storage devices 148). Therefore, while certain elements are shown to reside in main memory 122, those skilled in the art will recognize that these are not necessarily all completely contained in main memory 122 at the same time. It should be noted that the term "memory" is used herein to generically refer to the entire virtual memory of data processing system 114.

Network interface 126 allows data processing system 114 to send and receive data to and from any network the workstation may be connected to. This network may be a local area network (LAN), a wide area network (WAN), or a global information network such as the Internet. Suitable methods of connecting to the Internet 110 include known analog and/or digital techniques, as well as networking mechanisms that are developed in the future. Many different network protocols can be used to implement a network. The protocols are implemented in specialized software programs that allow computers to communicate across a network. TCP/IP (Transmission Control Protocol/Internet Protocol), used to communicate across the Internet 110, is an example of a suitable network protocol.

System bus 128 allows data to be transferred among the various components of data processing system 114. Although data processing system 114 is shown to contain only a single main CPU 120 and a single system bus 128, those skilled in the art will appreciate that the present disclosure may be practiced using a data processing system that has multiple CPUs 120 and/or multiple busses 128. In addition, the interfaces that are used in the preferred embodiment may include separate, fully programmed microprocessors that are used to off-load computationally intensive processing from CPU 120, or may include input/output (I/O) adapters to perform similar functions.

The private keys of each user may be stored on a personally held smart card 134. Storing the private key in smart card 134 is advantageous because the private key is safely maintained therein, never leaving smart card 134 or passing through the data processing system 114. Even if data processing system 114 is compromised, the user's private key is not available to the intruder. Smart card reader 132 is coupled to CPU 120 through system bus 130. Smart card reader 132 receives smart card 134 in a conventional manner. Each smart card 134 is unique to its owner-user and contains the user's private keys and any public keys, as well as any other data that may be required by the systems with which smart card 134 is utilized. Smart card 134 further includes microprocessor technology that embeds known, selected symmetric encryption schemes such as RC4, DES, or 3DES, and asymmetric encryption schemes, such as RSA, Diffie-Hellman, DSS, and the like in a memory device coupled to a microprocessor. The smart card 134 is thus capable of performing encryption and decryption operations in accordance with the encryption scheme utilized.

While the present disclosure is described in the context of a fully functional data processing system, those skilled in the art will appreciate that the present disclosure is capable of being distributed as an article of manufacture in a variety of forms, and that the present disclosure applies equally regardless of the particular type of signal bearing media used to actually carry out the distribution. Examples of signal bearing media include: recordable type media such as floppy disks and CD-ROM, transmission type media such as digital and analog communications links, as well as other known media storage and distribution systems.

Figure 2:
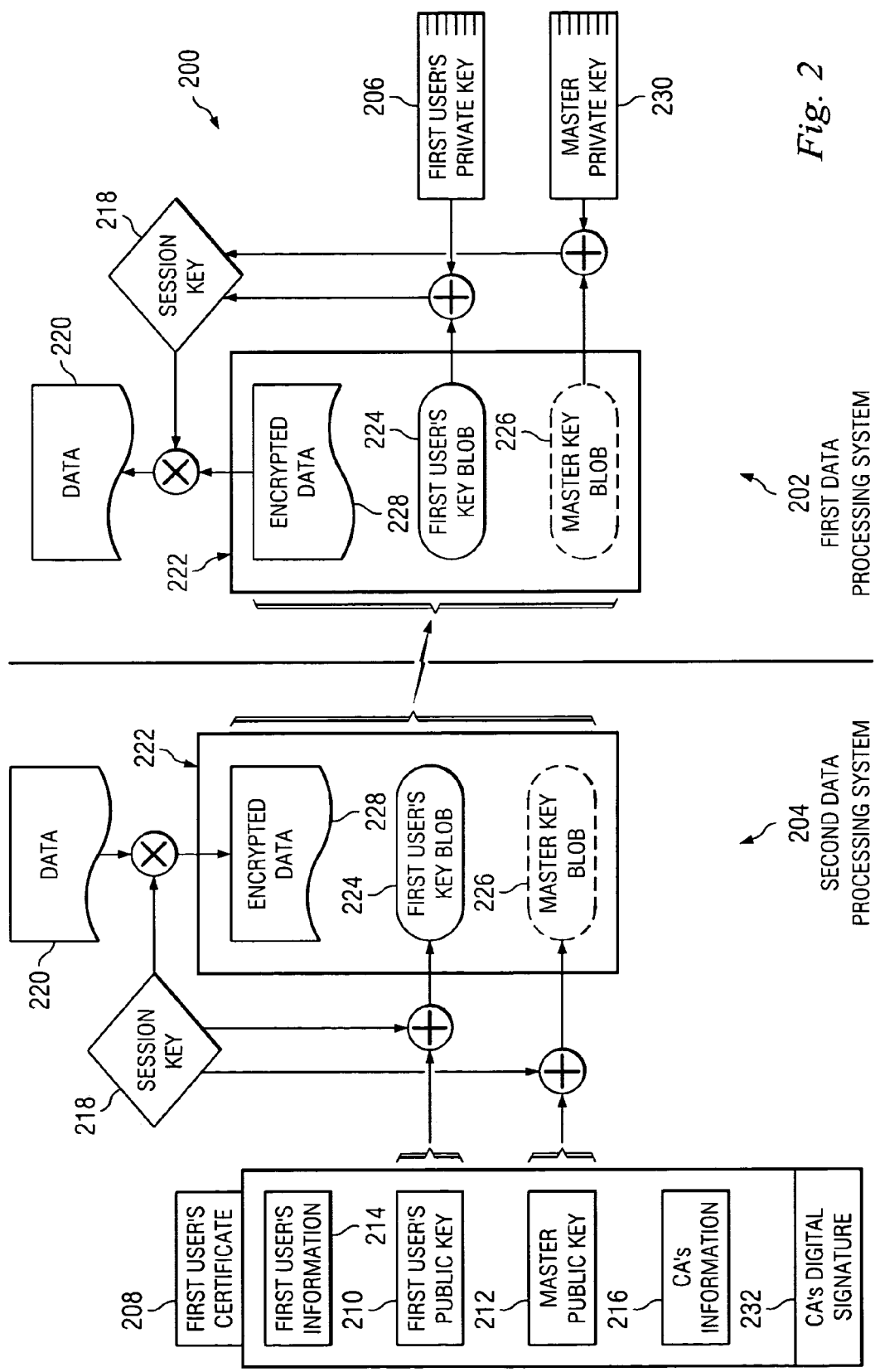
FIG. 2 is a block diagram of a typical encryption system according to the present disclosure.

FIG. 2 shows a diagram of one embodiment of the present disclosure for a computer-based public key data encryption system 200 for secure communication between first data processing system 202 and second data processing system 204 that allows an authorized third party to gain access to encrypted files without the overhead of placing additional information in escrow. As shown in FIG. 2, the first user's private key 206 is stored in the first data processing system 202 for encrypting information sent by the second user to the first user. Certificate 208 includes data pertaining to the first user including the first user's public key 210, master public key 212, and other information about the first user's public key 214 and the certifying authority 216. While FIG. 2 shows data for only one user, second data processing system 204 may store or have access to certificate information for every user with which encrypted information is exchanged.

In order to transmit a message to the first user on first data processing system 202, second data processing system 204 includes program instructions to generate session key 218, to encrypt data 220 using session key 218, to encrypt session key 218 with first user's public key 210, to encrypt session key 218 with master public key 212, to generate data packet 222 including encrypted session keys 224, 226 and encrypted data 228, and to transmit data packet 222 to first data processing system 202. Note that data packets such as data packet 222 may be generated and transmitted to one or more different data processing systems instead of or in addition to first data processing system 202, using the appropriate user's public key, session key 218 or a new session key, and master public key 212. First data processing system 202 receives encrypted data 228, and includes program instructions to decrypt encrypted session key 224 with first user's private key 206, and to decrypt encrypted data 228 with session key 218 to re-create original data 220.

Note that the present disclosure also includes master public key 212 and master private key 230 to allow an authorized third party to gain access to encrypted data received by a user. The third party executes program instructions on first data processing system 202 to decrypt encrypted session key 224 using master private key 230, and to decrypt encrypted data 228 with session key 218 and to re-create original data 220. Thus, the present disclosure advantageously provides a system that allows non-repudiation to be established with only one key pair and simplifies key escrow procedures and the attendant database management overhead. Additionally, multiple master public keys can be created for designated multiple master key authorities. This would require all the designated authorities to combine their master private keys to decrypt the session key, thereby further helping to ensure that the encrypted data is accessed only by authorized third parties.

Figure 3:
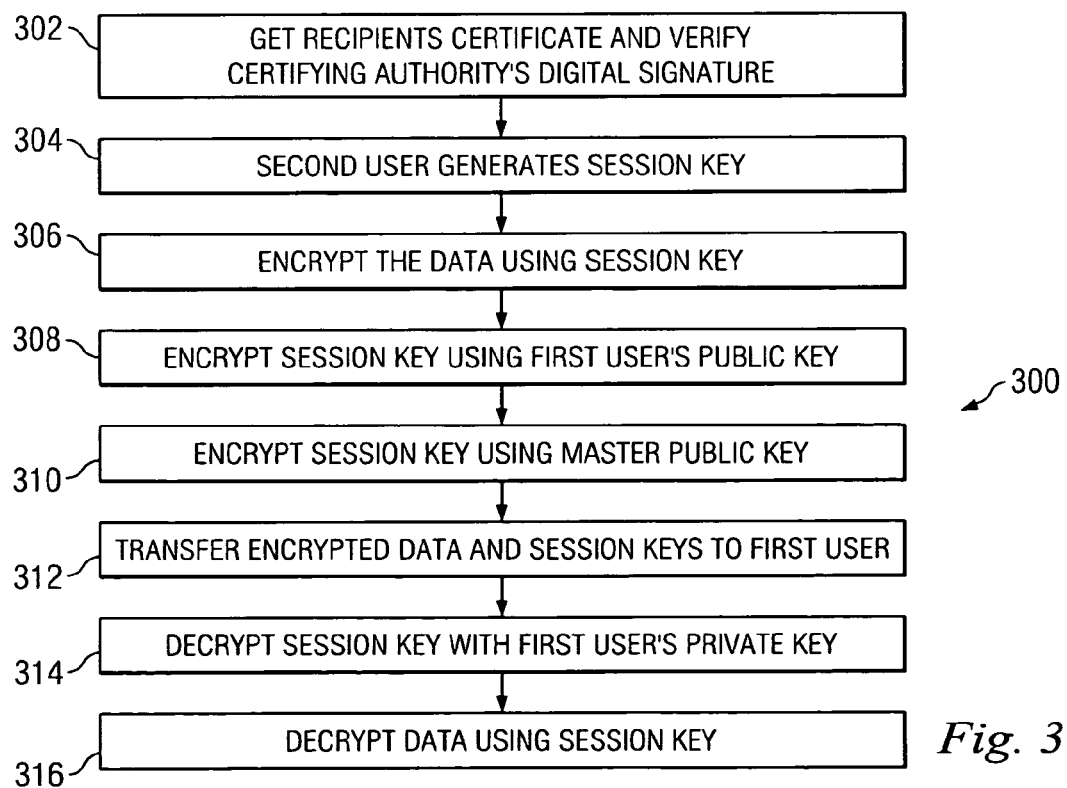
FIG. 3 is a flowchart of the method for encrypting and decrypting data according to the present disclosure.

Public key data encryption system 200 may utilize one or more of several known asymmetric and symmetric encryption routines, depending on the user's requirements. One embodiment implementing the present public key data encryption system 300 using the known Diffie-Hellman method, for example, is shown in FIG. 3. In order to transmit a message from second user to first user using the Diffie-Hellman method, second user obtains first user's certificate 208 and verifies the certifying authority's digital signature 232 as shown in block 302. Second data processing system 204 next generates session key 218 as outlined in block 304 for the communication session using the first user's public key 210 and the second user's own private key (not shown). The second user then encrypts message data 220 using session key 218 and places his own public key unencrypted at the head of encrypted data packet 222 as shown in block 306. The second user's public key 210 and the master public key 212 are then utilized to encrypt session key 218 as shown in blocks 308 and 310. The encrypted data packet 222 is transmitted to first data processing system 202 as shown in block 312.

Upon receiving encrypted data packet 222, first data processing system 202 generates session key 218 using second user's public key and first user's private key 206 as shown in block 314, and then uses session key 218 to decrypt encrypted data 228 as shown in block 316. A similar process is followed when an authorized third party requests access to encrypted data 228 using master public key 212 and master private key 230 instead of first user's public and private keys 210, 206.

Note that the Diffie-Hellman scheme requires that a trusted entity or a certifying authority sign the receiving user's public key certificate so that a sending user can trust that the information contained within is correct. Another well-known asymmetric key algorithm, the RSA algorithm, involves the computationally intensive task of factoring a number that is the product of two large prime numbers. As with the Diffie-Hellman scheme, the RSA algorithm is relatively straightforward to compute but practically infeasible to invert. Thus, it is not feasible to derive the private key from the public key and, in this way, the privacy of the communication is preserved. Once a message is encrypted with the public key using the RSA algorithm, only the private key can decrypt it, and vice versa. As with the Diffie-Hellman scheme, the RSA algorithm requires a trusted entity to certify and publicize the user's public keys. In contrast to the Diffie-Hellman scheme, however, the RSA algorithm does not itself generate a session key to be used symmetrically by the parties. Instead, the public encryption key for a particular user directly encrypts communications to that user and that user's private decryption key decrypts those communications encrypted with the user's public key.

Because the asymmetric encryption algorithms can be relatively computationally intensive compared to symmetric encryption algorithms, it is much simpler and efficient to use an asymmetric algorithm to encrypt and decrypt a cipher key that may then be used to encrypt and decrypt data using a symmetric algorithm. Thus, the present disclosure may be implemented using an asymmetric encryption algorithm, a symmetric encryption algorithm, or a combination of an asymmetric and symmetric encryption algorithm. The embodiments of the present disclosure would then change accordingly, however, the important aspect is the inclusion of one or more master public keys and one or more master private keys to allow an authorized third party to access the encrypted data even when the user's private key is not accessible.

While the embodiments have been described with respect to the embodiments and variations set forth above, these embodiments and variations are illustrative and the disclosure, is not to be considered limited in scope to these embodiments and variations. For example, a user's private key or master key may be stored on a smart card, however, the private keys may also be stored on alternate computer readable mediums that are incorporated in data processing system 114. Accordingly, various other embodiments and modifications and improvements not described herein may be within the spirit and scope of the present disclosure, as defined by the following claims.

What is claimed is:

1. A method for encrypting data, the method comprising:
providing a first data processing system for a first user and a second data processing system for a second user;
providing a session key randomly generated by the second system for use in encrypting original data;
encrypting the data by the second system using the session key and a symmetric encryption routine;
encrypting the session key by the second system, with a public key of the first user using an asymmetric encryption routine, for storage as a first user key blob;
encrypting the session key by the second system, with a master public key using the asymmetric encryption routine, for storage as a master key blob, wherein the session key is thereby twice encrypted;
storing by the first system a first user private key on any media;
decrypting the user key blob by the first system using the asymmetric encryption routine providing the first system with access to the session key;
the first system decrypting the data using the symmetric encryption routine; and the second system securely transmitting the data to the first system.

2. The method, as set forth in claim 1, further comprising storing the first user's private key on a data storage medium coupled to a destination data processing system.

3. The method, as set forth in claim 2, further comprising retrieving the first user's private key from a smart card utilizing a smart card reader coupled to the destination data processing system.

4. The method, as set forth in claim 2, further comprising retrieving a master private key from a smart card utilizing a smart card reader coupled to the destination data processing system.

5. The method, as set forth in claim 1, further comprising storing a master private key on a data storage medium coupled to the destination data processing system.

6. The method, as set forth in claim 1, further comprising utilizing a plurality of public keys and a plurality of private keys.

7. A method for encrypting data comprising:
providing a first data processing system for a first user and a second data processing system for a second user;
providing a session key randomly generated by the second system for use in encrypting original data;
encrypting the data by the second system using the session key and a symmetric encryption routine;
encrypting the session key by the second system, with a public key of the first user using an asymmetric encryption routine, for storage as a first user key blob;
encrypting the session key by the second system, with a master public key using the asymmetric encryption routine, for storage as a master key blob, wherein the session key is thereby twice encrypted;
storing by the first system a first user private key on any media;
decrypting the user key blob by the first system using the asymmetric encryption routine providing the first system with access to the session key;
the first system decrypting the data using the symmetric encryption routine;
the second system securely transmitting the data to the first system; and
a third party gaining access to the data using a master private key to decrypt the master key blob using the asymmetric encryption routine and gain access to the original data.

8. The method as set forth in claim 7, wherein the first user's private key is stored on a data storage medium coupled to the second data processing system.

9. The method as set forth in claim 7, wherein a master private key is stored on a data storage medium coupled to the second data processing system.

10. The method as set forth in claim 7, further comprising a smart card reader coupled to the second data processing system and operable to retrieve the first user's private key from a smart card.

11. The method as set forth in claim 7, further comprising a smart card reader coupled to the second data processing system and operable to retrieve a master private key from a smart card.

12. The method as set forth in claim 7, further comprising:
a plurality of private keys; and
a plurality of public keys.

13. A method for encrypting data comprising:
providing a first data processing system for a first user and a second data processing system for a second user;
the second user sending the first user a data file;
the second system randomly generating a session key for use in encrypting original data in the data file;
using the session key, the second system encrypting the data using a symmetric encryption routine;
encrypting the session key by the second system, with a public key of the first user using an asymmetric encryption routine, for storage as a first user key blob within the encrypted data;
encrypting the session key by the second system, with a master public key using the asymmetric encryption routine, for storage as a master key blob within the encrypted data, wherein the session key is thereby twice encrypted;
the second system transmitting the encrypted data to the first system;
storing by the first system a first user private key on any media;
decrypting the user key blob by the first system using the asymmetric encryption routine providing the first system with access to the randomly generated session key;
the first system decrypting the data using the symmetric encryption routine and the second system securely transmitting the data to the first system; and
a third party gaining access to the data using a master private key to decrypt the master key blob using the asymmetric encryption routine and gain access to the original data.

* * * * *